United States Patent
Kanno

(10) Patent No.: US 7,209,265 B2
(45) Date of Patent: Apr. 24, 2007

(54) METHOD, APPARATUS AND COMPUTER PROGRAM PRODUCT FOR INITIALIZING IMAGE PROCESSING APPARATUS

(75) Inventor: Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 756 days.

(21) Appl. No.: 09/816,220

(22) Filed: Mar. 26, 2001

(65) Prior Publication Data

US 2001/0040704 A1  Nov. 15, 2001

(30) Foreign Application Priority Data

Mar. 24, 2000 (JP) .............................. 2000-083646

(51) Int. Cl.
*H04N 1/04* (2006.01)
*H04N 1/00* (2006.01)

(52) U.S. Cl. .................. 358/474; 358/437; 399/79; 399/76; 399/81; 700/11; 377/30

(58) Field of Classification Search ................ 399/205, 399/211, 206, 208, 76–79, 81; 358/474, 358/483, 437, 497, 443; 356/334, 608, 602, 356/153, 152.1, 601; 700/11; 377/30
See application file for complete search history.

(56) References Cited

U.S. PATENT DOCUMENTS

| | | | | |
|---|---|---|---|---|
| 3,813,157 A | * | 5/1974 | Fantozzi | 399/79 |
| 5,276,875 A | * | 1/1994 | Satoh | 399/76 |
| 6,072,585 A | * | 6/2000 | Dutton et al. | 358/1.12 |
| 6,564,028 B2 | * | 5/2003 | Kanno | 399/205 |

FOREIGN PATENT DOCUMENTS

| | | |
|---|---|---|
| JP | 05-027496 | 2/1993 |
| JP | 09-238209 | 9/1997 |
| JP | 10-341311 | 12/1998 |

OTHER PUBLICATIONS

U.S. Appl. No. 09/816,220, filed Mar. 26, 2001, Kanno.
U.S. Appl. No. 10/692,792, filed Oct. 27, 2003, Kizaki et al.
U.S. Appl. No. 10/694,062, filed Oct. 28, 2003, Kizaki et al.
Pending U.S. Appl. No. 09/816,220, filed Mar. 26, 2001.
Pending U.S. Appl. No. 09/917,922, filed Jul. 31, 2001.
U.S. Appl. No. 10/613,998, filed Jul. 8, 2003, Kanno.
U.S. Appl. No. 09/917,922, filed Jul. 31, 2001, Akita et al.

* cited by examiner

*Primary Examiner*—Thomas D. Lee
*Assistant Examiner*—Heather D Gibbs
(74) *Attorney, Agent, or Firm*—Oblon, Spivak, McClelland, Maier & Neustadt, P.C.

(57) ABSTRACT

An image processing apparatus including a scanner with a direct control section configured to control a scanning operation of the scanner so as to input image information from an original document and a main body configured to process the image information. The main body includes a control section configured to perform an initializing process for the main body. Further, a homing operation of the scanner is performed by the direct control section independently of the initializing process of the control section of the main body, when power is supplied to the image processing apparatus or when the image processing apparatus is returned from a shutdown state.

29 Claims, 15 Drawing Sheets

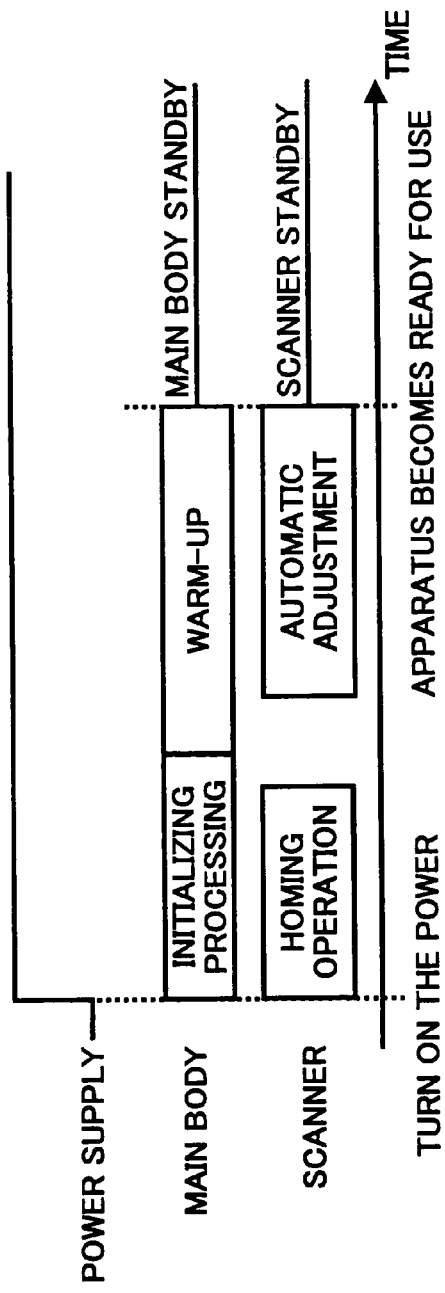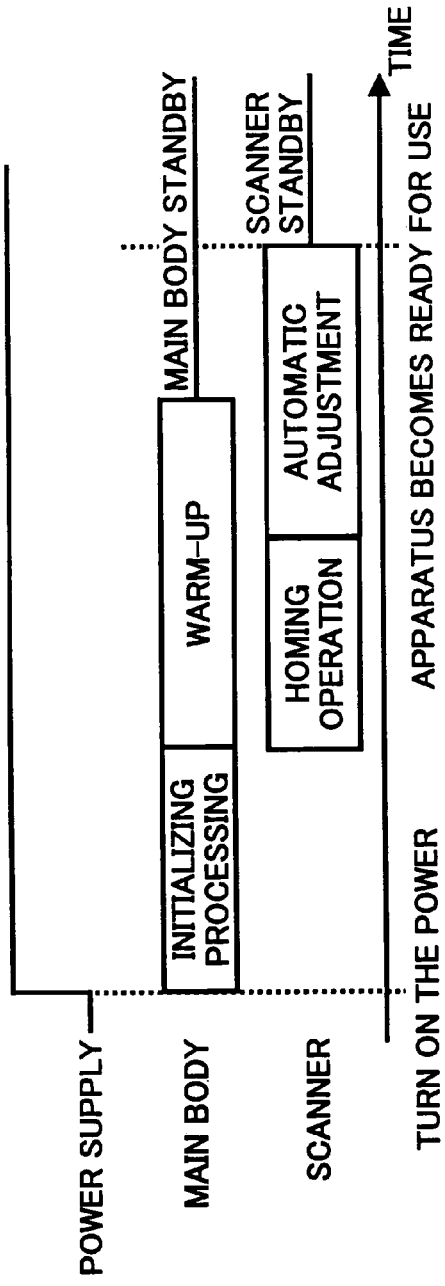

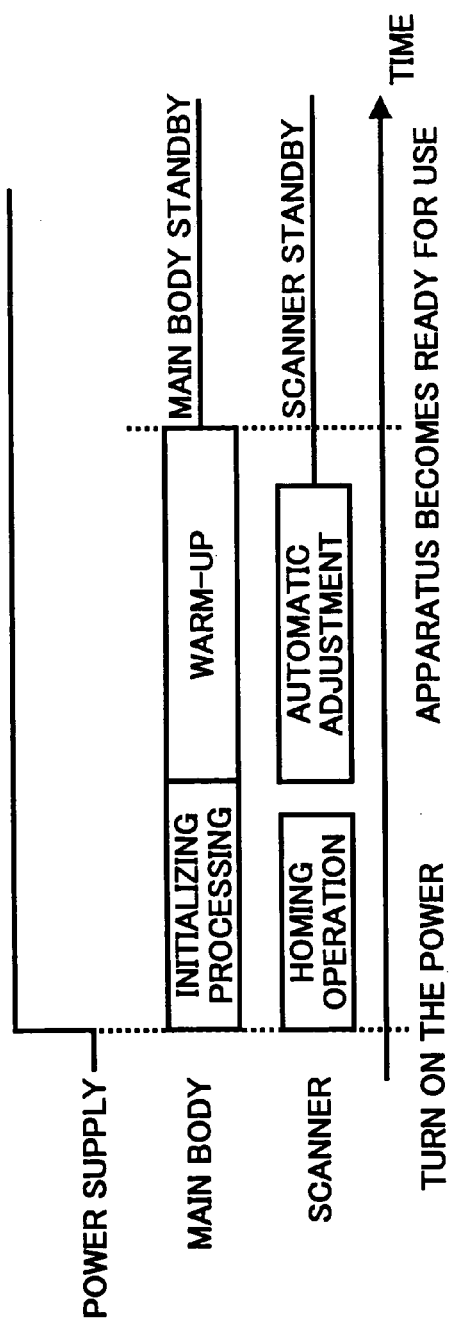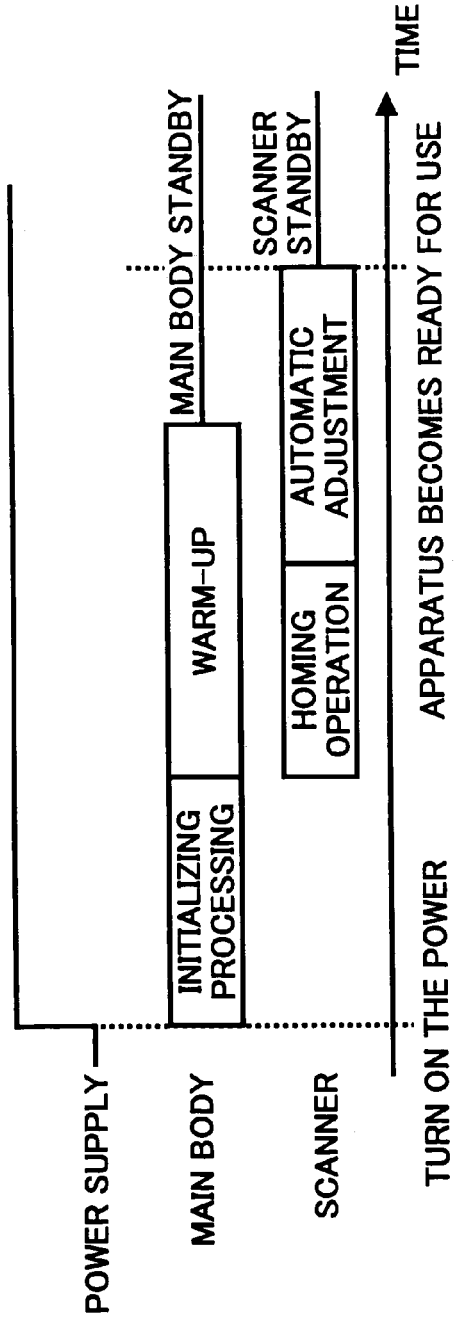

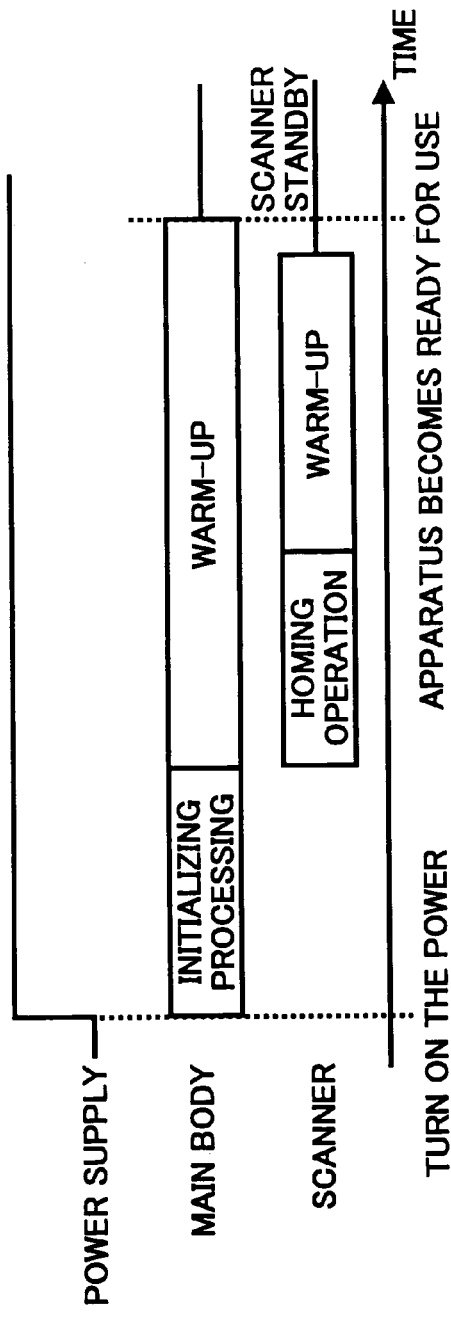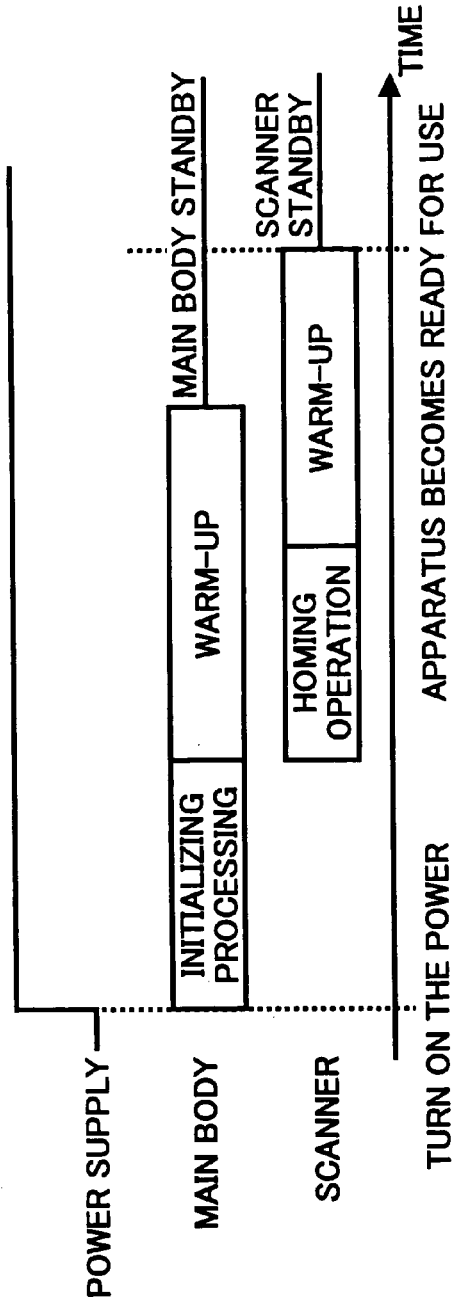

METHOD, APPARATUS AND COMPUTER PROGRAM PRODUCT FOR INITIALIZING IMAGE PROCESSING APPARATUS

CROSS-REFERENCE TO A RELATED APPLICATION

This document claims priority and contains subject matter related to Japanese Patent Application No. 2000-083646, filed on Mar. 24, 2000, the entire contents of which are incorporated by reference.

BACKGROUND OF THE INVENTION

1. Field of the Invention

The present invention relates to a method and a computer program product for initializing a scanner (i.e., an image information readout unit) to be used in a multifunctional DPPC (Digital Plain Paper Copier), and more particularly to a method and a computer program product that can perform the initializing processing of the scanner in a short period of time.

2. Discussion of the Background

A recently developed DPPC (i.e., Digital Plain Paper Copier) may configured such that power is supplied to the whole system of the DPPC by turning on a power switch. Further, the DPPC may be put in a shutdown state by stopping the power supply using a power key (e.g., a soft key), except some power may still be supplied to a monitoring part. In these types of DPPCs, when a power switch is turned on or when a return operation from a shutdown state is performed, a homing operation of a scanner unit is generally performed based on an instruction from a main body of the DPPC. The instruction is provided after an initializing process of the main body is completed. The scanner unit then makes an automatic adjustment to its reading image data system. Thus, the initializing process of the scanner unit is performed according to a program of the main body.

Turning now to FIG. 14, which is a flow chart showing the initializing process steps of the background art, which is performed based on a program of a main body when a power switch is turned on or when a return operation from a shutdown state is performed. As shown in FIG. 14, when the power is turned on or when a return operation from a shutdown state is performed (step S111), an initializing process of the main body is performed (step S112). When the initializing process of the main body is completed, a homing operation of the scanner is performed based on an instruction from the main body (step S113), because necessary preparations required for performing the initializing process of the scanner is completed in the side of the main body. The scanner then makes an automatic adjustment to its reading image data system (step S114). In the side of the main body, a warm-up is performed (step S115) until the main body reaches a predetermined temperature required for an image fixing process. When all necessary initializing processes are completed, the apparatus is ready for use.

According to the above-described flow chart, the scanner is ready for use when the initialization process of the scanner is completed. Conventionally, it takes a long time before the warm-up process of the main body is completed. Further, it generally takes a longer time for the warm-up process of the main body than for the initialization process of the scanner. Therefore, the time required for the initialization process of the scanner (such as a homing operation and an automatic adjustment) is not an important time factor in regulating a period of time required to have the DPPC in an operational state.

Turning now to FIGS. 15A and 15B, which are timing diagrams showing an operation of the initialization process performed according to the background art. As illustrated in FIG. 15A, the time required to warm-up the main body is longer than the time required to perform the initialization process of the scanner, such as a homing operation and an automatic adjustment. Thus, the time it takes to place the DPPC in an operational state depends on how long it takes to warm-up the main body.

However, considerable efforts are being put into developing an image forming apparatus which meets the ZESM (Zero Energy Standby Mode) standard, which advocates saving energy. As a result, the time required for a warm-up process of the main body has drastically been shortened. Therefore, the time required to initialize the scanner is an important factor in the amount of time required to place the DPPC in an operational state. That is, as illustrated in FIG. 15B, the time required to start the DPPC depends on the time required to complete the initialization process of the scanner.

SUMMARY OF THE INVENTION

Accordingly, the present invention has been made to solve the above-noted and other problems.

Another object of the present invention is to provide a novel method and computer program product that can perform the initialization process of the scanner in a short time period.

To achieve these and other objects, the present invention provides a novel image processing apparatus including a scanner having a direct control section configured to control a scanning operation of the scanner so as to input image information from an original document, and a main body configured to process the image information. The main body includes a control section configured to perform an initializing process for the main body. Further, a homing operation of the scanner is performed by the direct control section independently of the initializing process of the control section of the main body, when power is supplied to the image processing apparatus or when the image processing apparatus is returned from a shutdown state. The present invention also relates to a method and computer program product for initializing an image processing apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 9A and 9B are other timing diagrams showing operations of the initializing process performed according to the present invention;

FIGS. 12A and 12B are still other timing diagrams showing operations of the initializing process performed according to the present invention;

FIGS. 15A and 15B are timing diagrams showing operations of the initializing process performed according to the background art described in FIG. 14.

DETAILED DESCRIPTION OF THE PREFERRED EMBODIMENTS

Figure 1:
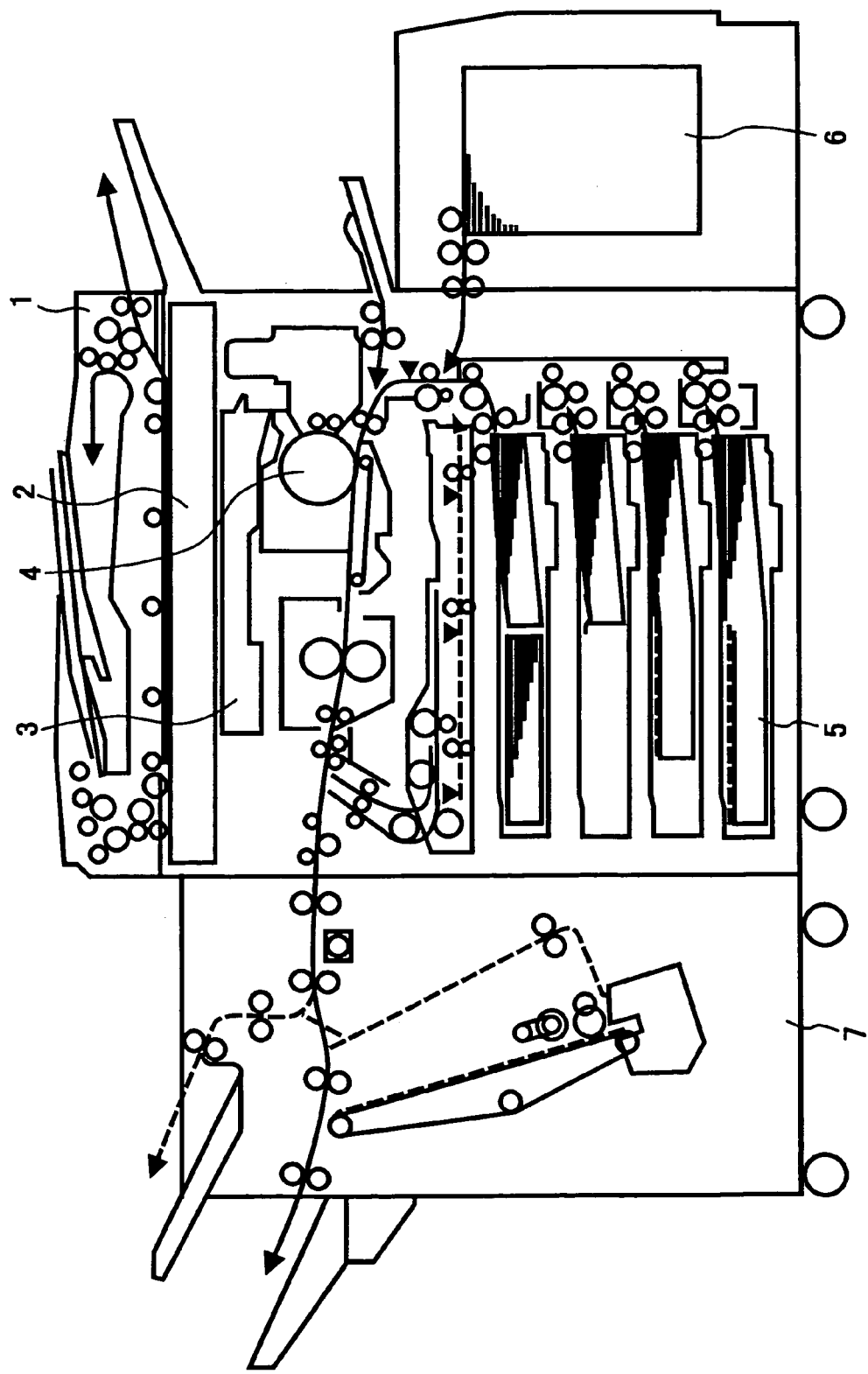
FIG. 1 is a schematic illustrating a construction of a multifunctional DDPC as an image forming apparatus according to the present invention.

Referring now to the drawings, wherein like reference numerals designate identical or corresponding parts throughout the several views, FIG. 1 is a schematic illustrating a construction of a multifunctional DPPC (digital plain paper copier) as an image processing apparatus according to the present invention.

The multifunctional DPPC includes a plurality of functions in addition to a copying function, such as a function of facsimile, printer, an electric file, and so forth. The multifunctional DPPC includes an ADF (Automatic Document Feeder) 1, a scanner unit 2, a writing unit 3, a processing unit 4, a first sheet feeding unit 5, a second sheet feeding unit 6, and a sheet discharging unit 7.

A summary of the operation of the multifunctional DPPC will now be explained. In an operation using a copying function, an original document placed on a document feeding tray provided in the ADF 1 is fed to a predetermined position on a platen arranged in the scanner unit 2 by a document feeding device, when a start key provided in an operation unit (not shown) is depressed. An image of the original document is read by the scanner unit 2 and the original document is then discharged to a document discharging tray. Further, the reading operation of an image of the original document is automatically repeated one after another, when there are a plurality of original documents.

In addition, in the writing unit 3, a laser beam is emitted according to imaging data obtained by reading the image of the original document in the scanner unit 2. A latent image is then formed on a surface of a photoconductive element. Next, the latent image formed on the surface of the photoconductive element is developed into a toner image by the developing section in the processing unit 4. The toner image is then transferred onto a transfer sheet supplied either from the first sheet feeding unit 5 or the second sheet feeding unit 6. The toner image transferred onto the transfer sheet is then fixed by the fixing section in the processing unit 4. Finally, the transfer sheet carrying the fixed image is discharged to an exit tray by the sheet discharging unit 7.

In an operation using a facsimile function or a file function, the ADF 1 and the scanner unit 2 are used as an input device to read an image of an original document and to obtain the image data. Then, the writing unit 3, the processing unit 4, and the sheet discharging unit 7 are used as an output device. Further, in an operation using a printer function, the writing unit 3, the processing unit 4 and the sheet discharging unit 7 are used as an output device.

Figure 2:
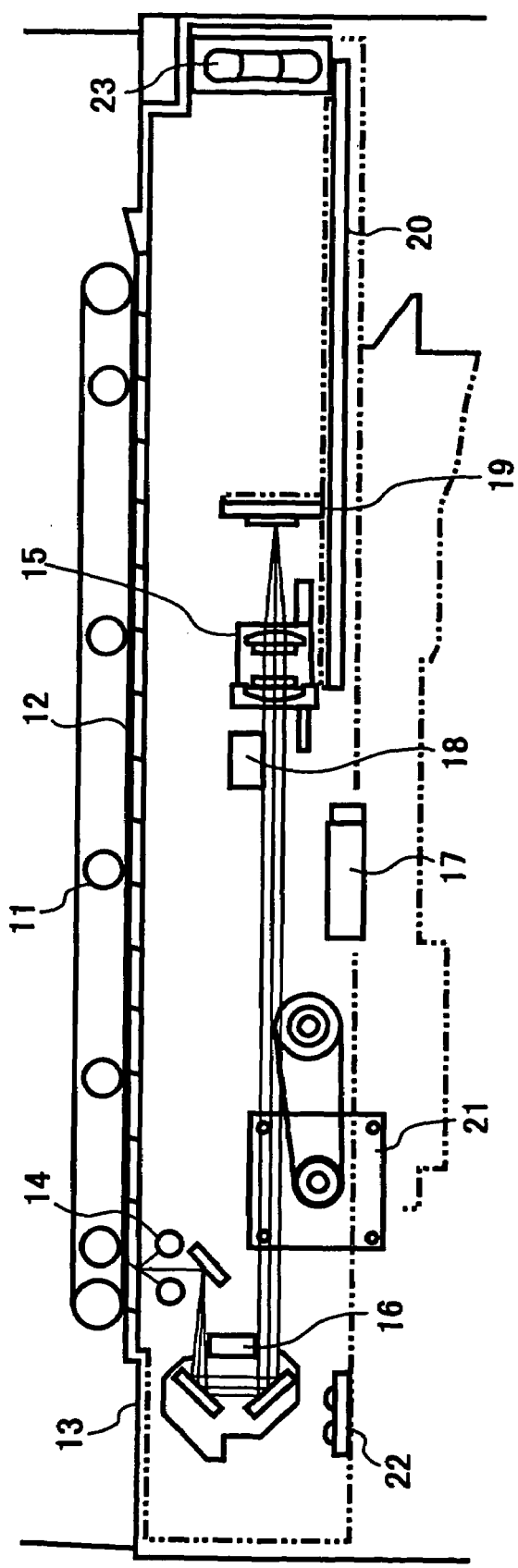
FIG. 2 is a schematic illustrating details of a scanner unit in FIG. 1.

Turning now to FIG. 2, details of the scanner unit 2 in FIG. 1 will be described. The scanner unit 2 includes a document feeding belt 11, a platen 12, a white plate 13, a lamp 14, and a lens 15. The scanner unit 2 further includes an optical positioning sensor 16, a first document size detection sensor 17, a second document size detection sensor 18, a sensor board 19, a scanner control board 20, a scanner motor 21, a heater 22, and a fan 23. In the scanner unit 2, an original document placed on the platen 12 is conveyed by the document feeding belt 11 and is irradiated with the lamp 14. The light reflected from the original document is then reflected by three mirrors to the lens 15 so as to form an image on a CCD (Charge-Coupled Device) image sensor provided on the sensor board 19. The lamp 14 and a group of mirrors are carried by a carriage which is driven by the scanner motor 21 with a wire. These components provide an image obtained while scanning an original document to the CCD image sensor arranged on the sensor board 19.

The CCD image sensor then converts the received light into an electric signal, and transmits the electric signal to an image processing section of the scanner control board 20 as the image data of the original document. Further, the first and second document size detection sensors 17 and 18 detect a size of the original document. The control section of the scanner control board 20 controls an initializing process (such as a homing operation), and an adjustment of an output power level of a sensor, etc. The scanner motor 21, which performs a scanning operation on an original document, is also controlled by the control section of the scanner control board 20. Next, an image of the white plate 13 is read, and the read image is used as reference data for performing a white level correction on the image data. The control section of the scanner control board 20 further controls the heater 20 (to prevent a condensation of dew) and the cooling fan 23.

Figure 3:
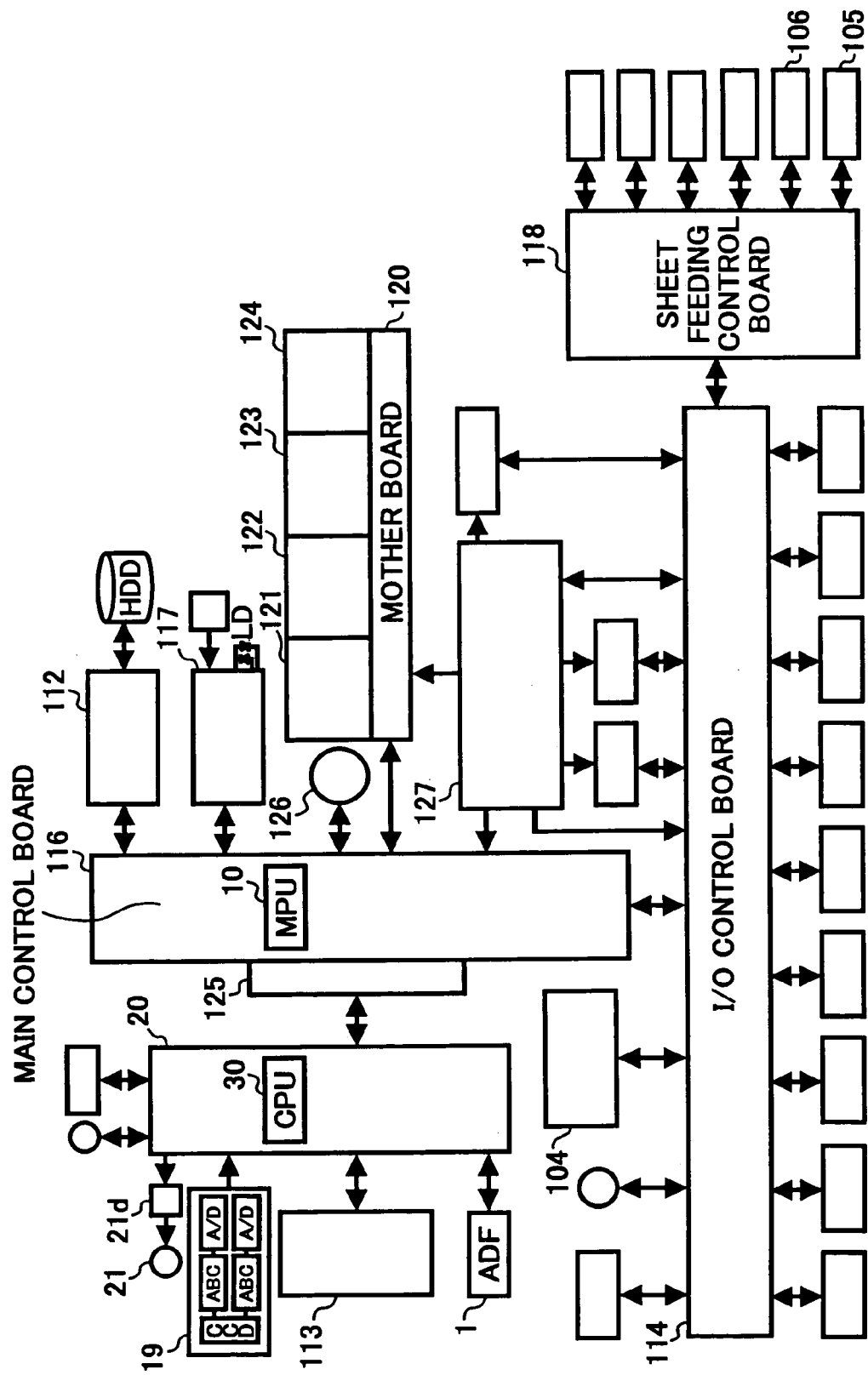
FIG. 3 is a block diagram illustrating a circuit structure of the multifunctional DDPC in FIG. 1.

Now referring to FIG. 3, which is a block diagram illustrating a circuit structure of the multifunctional DPPC shown in FIG. 1. The circuit of the multifunctional DPPC according to the present invention includes a main control board having a MPU 10, which controls an image forming sequence and a system relation. The circuit further includes the scanner control board 20 having a CPU 30 for controlling a scanning operation. The scanner control board 20 is connected to the main control board 16 via a scanner I/F 125. In addition to the scanner control board 20, the main control board 116 is also connected to a memory control board 112 (which controls memory devices, such as a HDD (Hard Disc Drive)), a laser diode (LD) control board 117 (which controls a laser diode for writing) and a polygon motor 126 (which scans a laser beam). The main control board 116 is also connected to a mother board 120, a power supply control board 127 (which supplies an electric power to each component of the apparatus), and an I/O control board 114 (which controls an input/output of various types of sensors, motors, and so forth).

In addition to the main control board 116, the scanner control board 20 is also connected to the sensor board 19

(which reads an original document with a CCD), an operation unit 113 to be used for a display and an input device as a user interface, the scanner motor 21 via a driving circuit 21d, and the ADF 1. In order to have multiple functions in addition to a copying function, the motherboard 120 includes a facsimile control unit (FCU) 121, a printer control unit 122, a scanner control unit 123, and an expanded function control unit 124 so that a function selected by an operator is performed. Further, in addition to the main control board 116, the power supply control board 127 is connected to the mother board 120 and the I/O control board 114. The I/O control board 114 is also connected to a duplex unit 104 and a sheet feeding control board 118. The sheet feeding control board 118 is further connected to a sheet feeding tray 105 and a large-capacity sheet feeding tray 106.

An initializing process of a scanner will now be described. According to the present invention, the multifunctional DPPC is configured such that a mechanical positioning operation of the scanner is performed by an instruction from a direct control section (i.e., the CPU30 of the scanner control board 20) of the scanner, when a power switch is turned on and before the control section of the main body (i.e., the main control board 116) is initialized.

Figure 4:
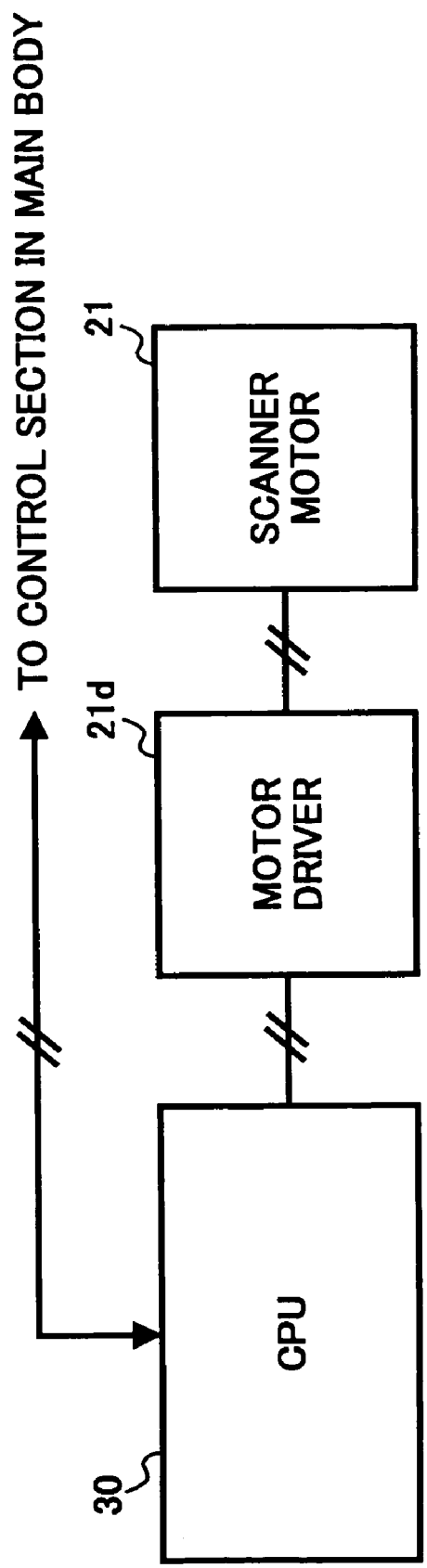
FIG. 4 is a diagram illustrating a configuration of a control section of the scanner performing the initialization process according to the present invention.

FIG. 4 is a diagram illustrating a configuration of the control section of the scanner, which performs the initializing process according to the present invention. As shown, the direct control section of the scanner includes the CPU 30 and the motor driver 21d, which controls a positioning of a scanner carriage by driving the scanner motor 21 so that a homing operation is performed in the initializing process.

Figure 5:
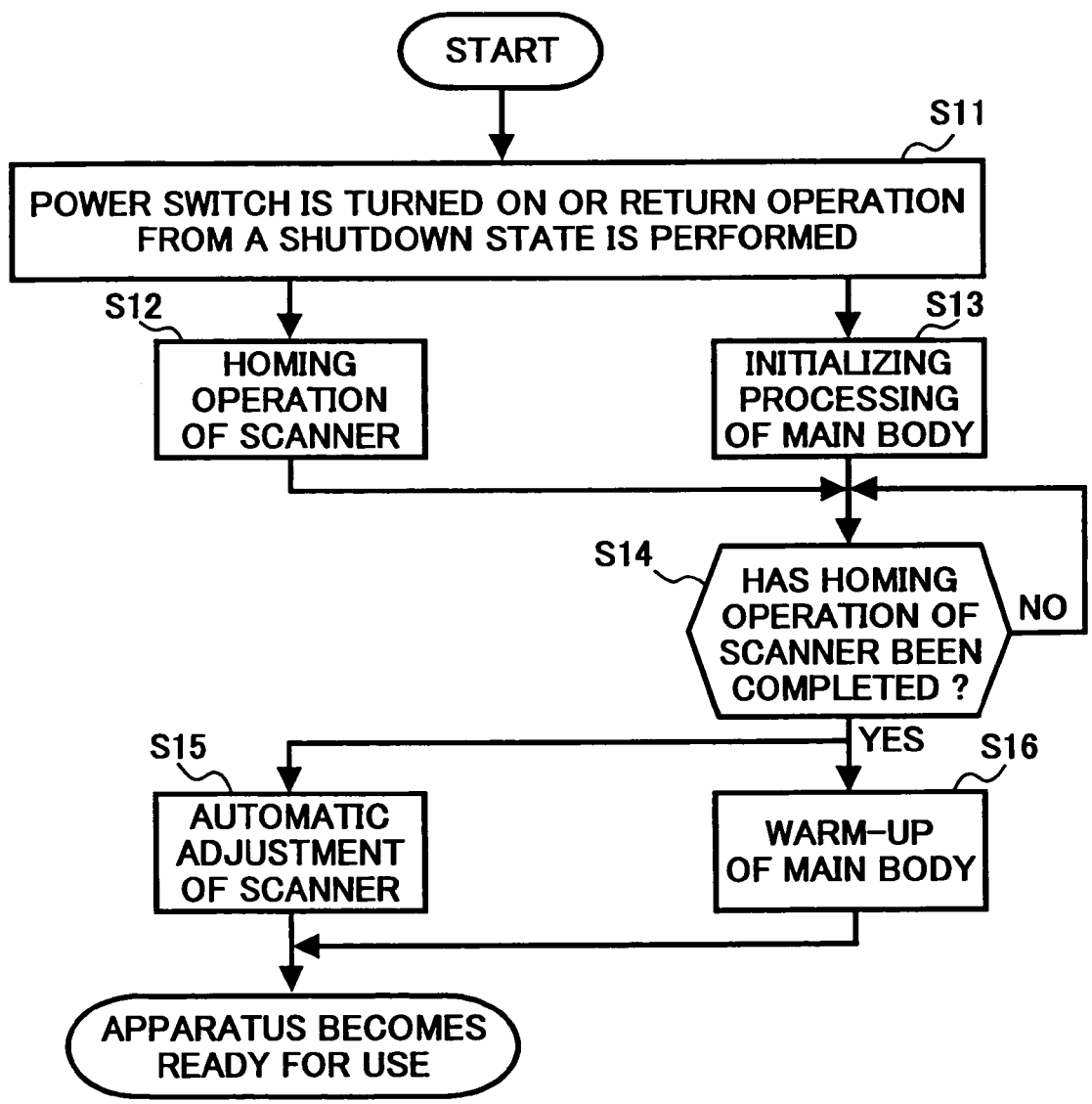
FIG. 5 is a flow chart showing the initializing process steps according to the present invention.

In addition, FIG. 5 is a flow chart showing the initializing process steps performed by the main body and the scanner according to the present invention, when a power switch is turned on or when a return operation from a shutdown state is performed. As shown in FIG. 5, the CPU 30 performs a power on reset of the scanner when a power switch is turned on or a return operation from a shutdown state is performed by the main body (step S11). Various internal initializing processes is then performed.

Immediately after these initializing processes have been performed, a homing operation is performed (step S12) without an instruction from the main control board 116. Then, the scanner is in a state of waiting for an instruction from the main control board 116. The main control board 116 performs the initializing processes of the main body (step S13) in parallel with the homing operation of the scanner, when a power switch is turned on or when a return operation from a shutdown state is performed. When the initializing process of the main body is performed, a preparation of data (necessary for the scanner to make an automatic adjustment to its reading image data system) is completed in the side of the main body.

The main control board 116 then confirms whether or not the homing operation of the scanner has been performed normally (step S14), by communicating with the CPU 30 of the scanner. Further, an occurrence of an abnormal homing operation is indicated to stop the operation when the homing operation is erroneously performed. When the homing operation is confirmed, the main control board 116 supplies the scanner with the necessary data for making an automatic adjustment to the reading image data system of the scanner. The scanner then makes the automatic adjustment based on the data supplied from the main control board 116 (step S15). Further, in the side of the main body, a warm-up operation is performed (step S16) until the main body reaches a predetermined temperature required for a fixing process of an image, after the completion of the homing operation of the scanner has been confirmed. When all necessary initializing processes including the automatic adjustment of the scanner and the warm-up of the main body have been completed, the apparatus is ready to use.

Figure 6:
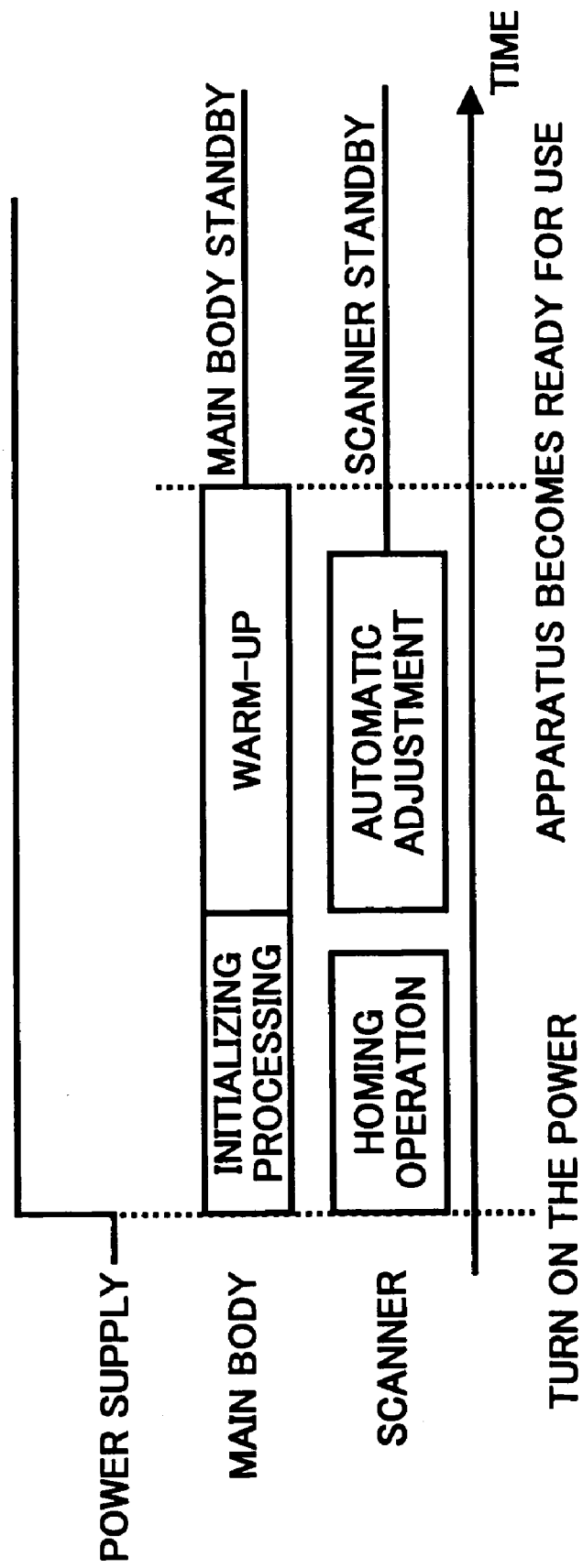
FIG. 6 is a timing diagram showing an operation of the initializing process performed according to the present invention.

Turning now to FIG. 6, which is a timing diagram illustrating the operation of the initializing process performed according to the present invention. Conventionally, the CPU 30 of the scanner is in a waiting-state for an instruction from the main control board 116 after the initializing process has been performed, such as a power on reset operation, and so forth (See FIGS. 15A and 15B). As discussed above, it takes a long time before the initializing process performed by the main control board 116 is completed and the main control board 116 is ready to provide an instruction to the CPU 30 of the scanner. During the time period when the main control board 116 performs the initializing process, the CPU 30 of the scanner stops its operation.

However, according to the present invention, a homing operation of the scanner is performed when the main body performs the initializing process, as shown in FIG. 6, which is conventionally a waiting time for the CPU 30 of the scanner. With this arrangement, the homing operation of the scanner is performed in parallel with the initializing process of the main body, which eliminates the extra time required for the homing operation of the scanner and the time required to get the apparatus up and running is reduced. Further, electric power is not supplied to the scanner unit 2 during a power-down nor a shutdown period of the main body. Therefore, the same homing operation of the scanner is performed when a power switch is turned on as well as when a return operation from a shutdown state is performed.

Figure 7:
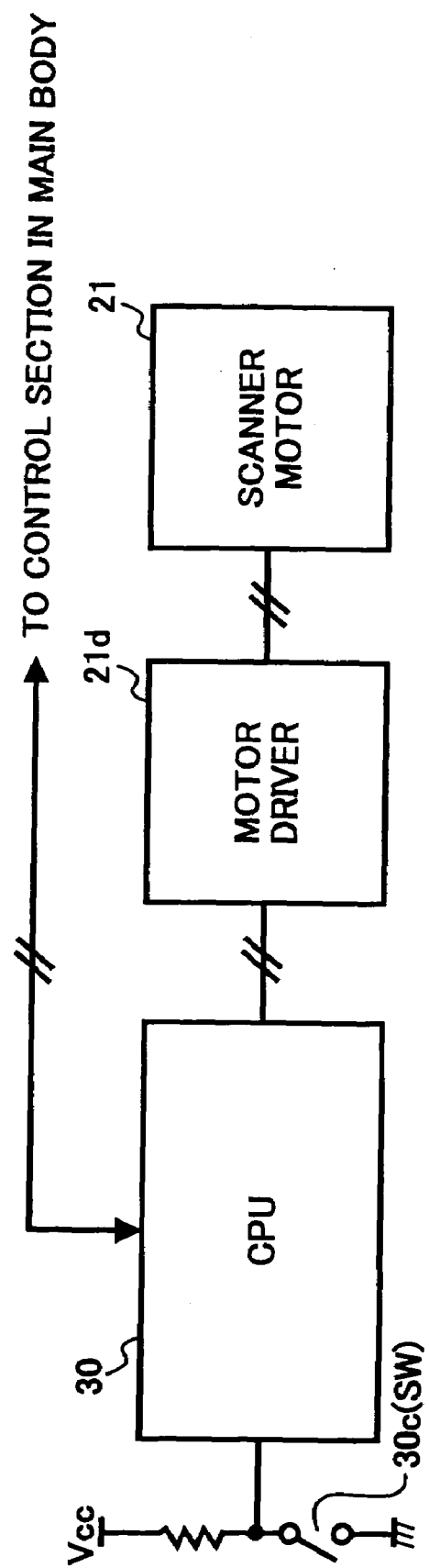
FIG. 7 is another diagram illustrating a configuration of the control section of the scanner performing the initializing process according to the present invention.

Next, another example of the initializing process of the scanner will be described. According to this example, a mode selection device is provided such that the scanner selects whether or not it independently performs a homing operation when a power switch is turned on or when a return operation from a shutdown state is performed. In more detail, FIG. 7 is a diagram illustrating a configuration of a control section of the scanner performing the initializing process according to the present invention. As illustrated in FIG. 7, a direct control section of the scanner includes the CPU 30, the motor driver 21d, and a resistor-switch SW30c. The resistor-switch SW30c serves as the above-mentioned selector by regulating a state of the CPU 30. Further, the direct control section of the scanner controls a positioning of a scanner carriage by driving the scanner motor 21 so that a homing operation is performed in an initializing process.

Figure 8:
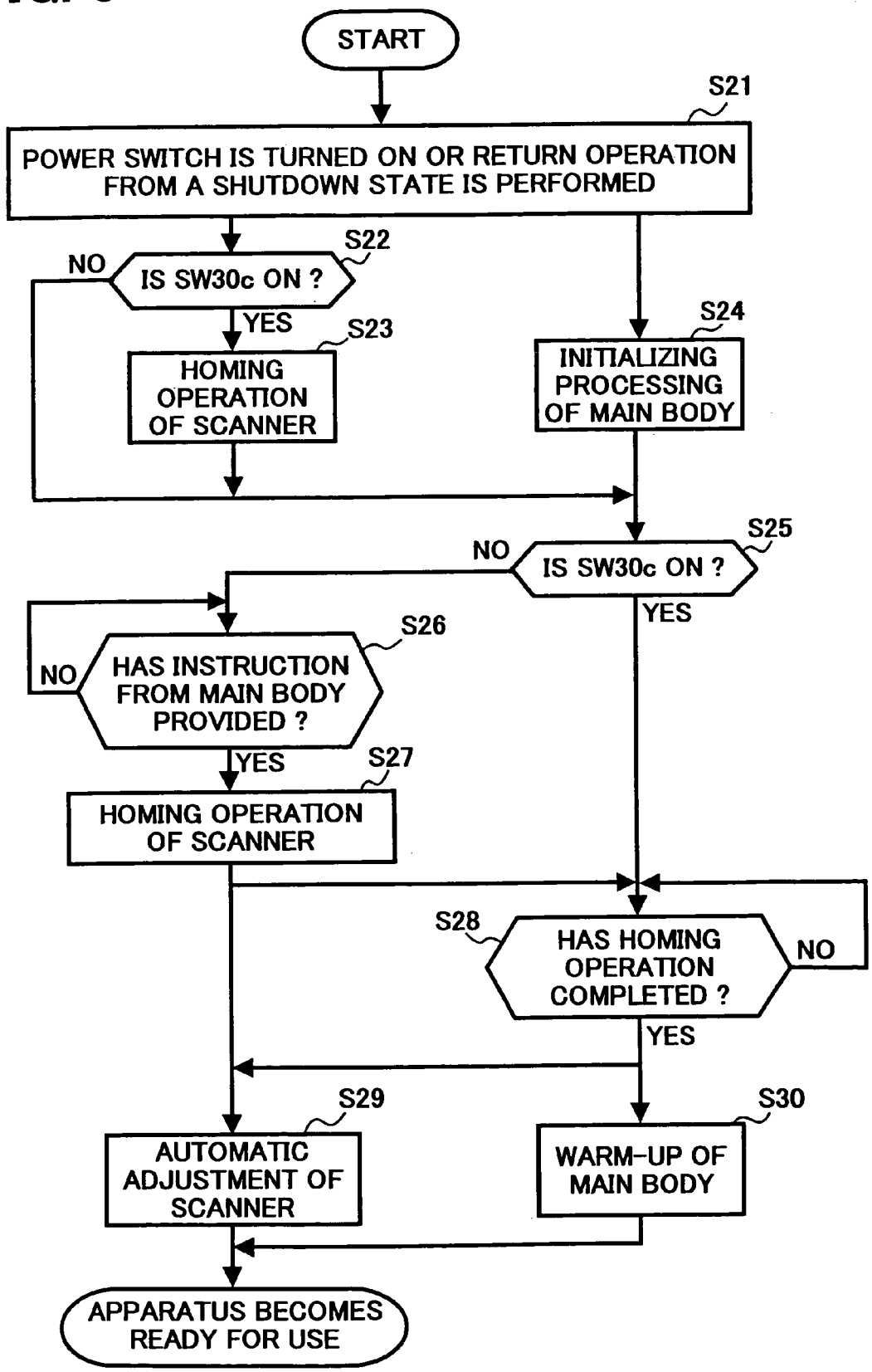
FIG. 8 is another flow chart showing the initializing process steps according to the present invention.

Turning now to FIG. 8, which is a flow chart illustrating the steps of the above-mentioned initializing process. As shown in FIG. 8, the CPU 30 performs a power on reset of the scanner when a power-on operation or a return operation from a shutdown state is performed by the main body (step S21). Then, after various internal initializing processes are performed, an ON/OFF state of the resistor-switch SW30c is checked (step S22). The resistor-switch SW30c regulates a state of the CPU 30. The CPU 30 input becomes "L" when the resistor-switch SW30c stays ON while the CPU 30 input becomes "H" when the resistor-switch SW30c stays OFF. Further, the resistor-switch SW30c is an operation switch that can be operated by an operator, for example. When it is determined the resistor-switch SW30c stays OFF (the CPU 30 input is "H") at step S22, the CPU 30 is in a state of waiting for an instruction from the main control board 116 without performing any operations. When it is determined the resistor-switch SW30c stays ON (the CPU 30 input is "L") at step 22, a homing operation of the scanner is immediately performed (step S23) without waiting for an instruction from the main control board 116. The scanner then enters into a waiting-state for an instruction from the main control board 116.

The main control board 116 performs the initializing process of the main body (step S24) when a power switch is turned on or when a return operation from a shutdown state is performed. When the initializing process of the main body is completed, the preparation of data required for the scanner to make an automatic adjustment to its reading image data system is completed in the side of the main body.

Further, an ON/OFF state of the resistor-switch SW30c is then checked (step S25). When the resistor-switch SW30c is in the ON state, the main control board 116 confirms whether or not the homing operation of the scanner has been normally performed (step S28) by communicating with the CPU 30 of the scanner. When the homing operation is erroneously performed, an occurrence of the abnormal homing operation is indicated to stop the operation.

When the completion of the homing operation is confirmed, the main control board 116 supplies the scanner with the data required for making an automatic adjustment to the reading image data system of the scanner. The scanner then makes the automatic adjustment based on the data supplied from the main control board 116 (step S29). Further, in the side of the main body, a warm-up operation is performed (step S30) until the main body reaches a predetermined temperature required for a fixing process of an image, after the completion of the homing operation of the scanner has been confirmed.

When the resistor-switch SW30c is found to be in the OFF state at step S25, the main body determines whether or not an operation of the scanner is required. When the main body determines the operation of the scanner is required, it provides the scanner with an instruction to perform a homing operation. In addition, the scanner communicates with the CPU 30 to confirm the instruction (step S26), and then performs the homing operation (step S27). The scanner also performs an automatic adjustment (step S29) to its reading image data system after the homing operation has been completed.

Further, the main control board 116 performs a warm-up operation (step S30) when it confirms the homing operation of the scanner has appropriately been performed (step S28). When all of the necessary initializing processes including the automatic adjustment of the scanner and the warm-up operation of the main body are completed, the apparatus is ready for use.

FIG. 9 is a timing diagram for an initializing process performed when a power switch is turned on or when a return operation from a shutdown state is performed, according to the present invention. In more detail, FIGS. 9A and 9B show examples of time periods for the initializing processes when the resistor-switch SW30c stays ON and OFF, respectively.

Conventionally, the CPU 30 of the scanner is in a waiting-state for an instruction from the main control board 116 after it has performed an initializing process, such as a power on reset operation, and so forth (see FIGS. 15A and 15B). As discussed above, it takes a long time before the initializing process is performed by the main control board 116 is completed and the main control board 116 is ready to provide an instruction to the CPU 30 of the scanner. During the time period when the main control board 116 performs the initializing process, the CPU 30 of the scanner stops its operation.

However, according to the present invention, when the resistor-switch SW30c stays ON, a homing operation of the scanner is performed during the period of time when the initializing processing of the main body is performed (which conventionally is a waiting period for the scanner). Thus, with the arrangement of the present invention, the homing operation of the scanner is performed in parallel with the initializing process of the main body, which eliminates the extra time required for the homing operation of the scanner, and the time required to get the apparatus up and running is reduced.

Further, when the resistor-switch SW30c stays OFF, the homing operation of the scanner is performed based on an instruction from the main body (which is provided after the initializing process of the main body has been completed), as illustrated in FIG. 9B. That is, the scanner is in a waiting-state for an instruction from the main body without performing a homing operation, when an instruction is not provided from the main body (this operation differs from that illustrated in FIG. 9B).

For example, in a multifunctional image forming apparatus configured to perform a return operation from a shutdown state when it receives a facsimile message, a scanner does not need to be operated. However, when the apparatus is configured to perform the homing operation of the scanner whenever a return operation from a shutdown state is performed, an unnecessary initializing processing of the scanner is performed. According to the present invention, the above-described unnecessary initializing process of the scanner is not performed.

Another example of the initializing process of the scanner performed according to the present invention will now be described. In this example, the above-described mode selection device is provided so the scanner selects whether or not it independently performs a homing operation when a power switch is turned on or when a return operation from a shutdown state is performed. However, the selection of whether or not the homing operation is performed is based on the contents of an electrically erasable programmable ROM (EEPROM).

Figure 10:
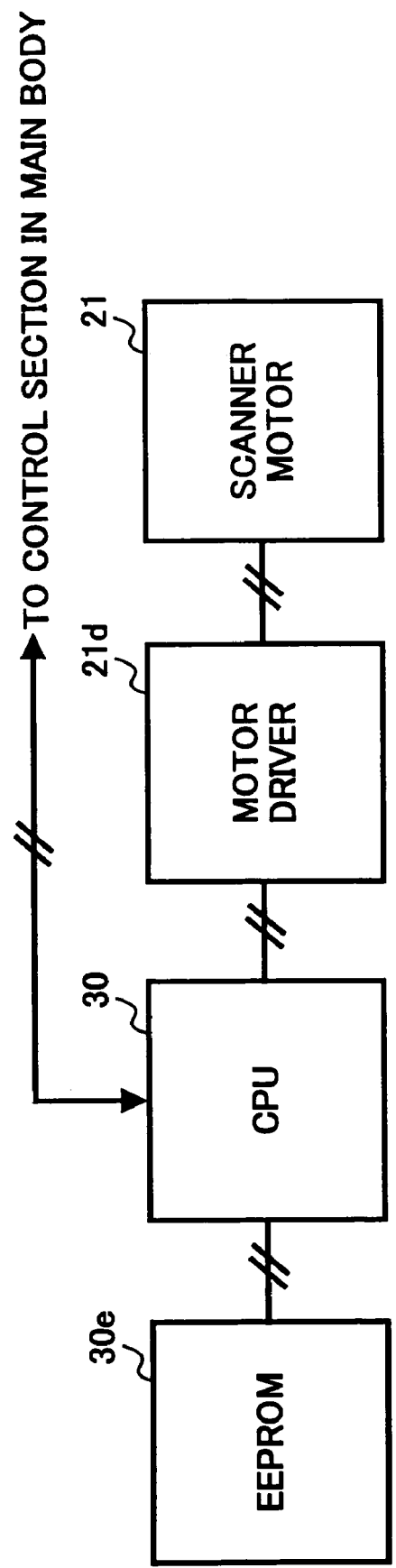
FIG. 10 is yet another diagram illustrating a configuration of the control section of the scanner performing the initializing process according to the present invention.

Turning now to FIG. 10, which is a diagram illustrating a configuration of a control section of the scanner performing the initializing process according to the present invention. As illustrated in FIG. 10, a direct control section of the scanner includes the CPU 30, the motor driver 21d, and the EEPROM 30e. The EEPROM 30e retains data on functions included with a multifunctional image forming apparatus, and serves as the above-mentioned mode selection device by providing the data to the CPU 30. The direct control section of the scanner also controls a positioning of a scanner carriage by driving the scanner motor 21 so that a homing operation is performed in the initializing process. That is, the CPU 30 decides whether or not it performs the homing operation at a power-on time based on the contents of the EEPROM 30e.

In addition, when a power switch of the apparatus is turned on for the first time (which is generally performed in an assembly process at a factory), the apparatus operates based on an initial value written in the EEPROM 30e. Then, when the main control board 116 normally starts, it detects functions included in the apparatus so as to write the detected contents into the EEPROM 30e via the CPU 30 of the scanner. Thus, when a power switch is turned on or when a return operation from a shutdown state is performed, the contents of the EEPROM 30e include the data on the functions of the apparatus.

Figure 11:
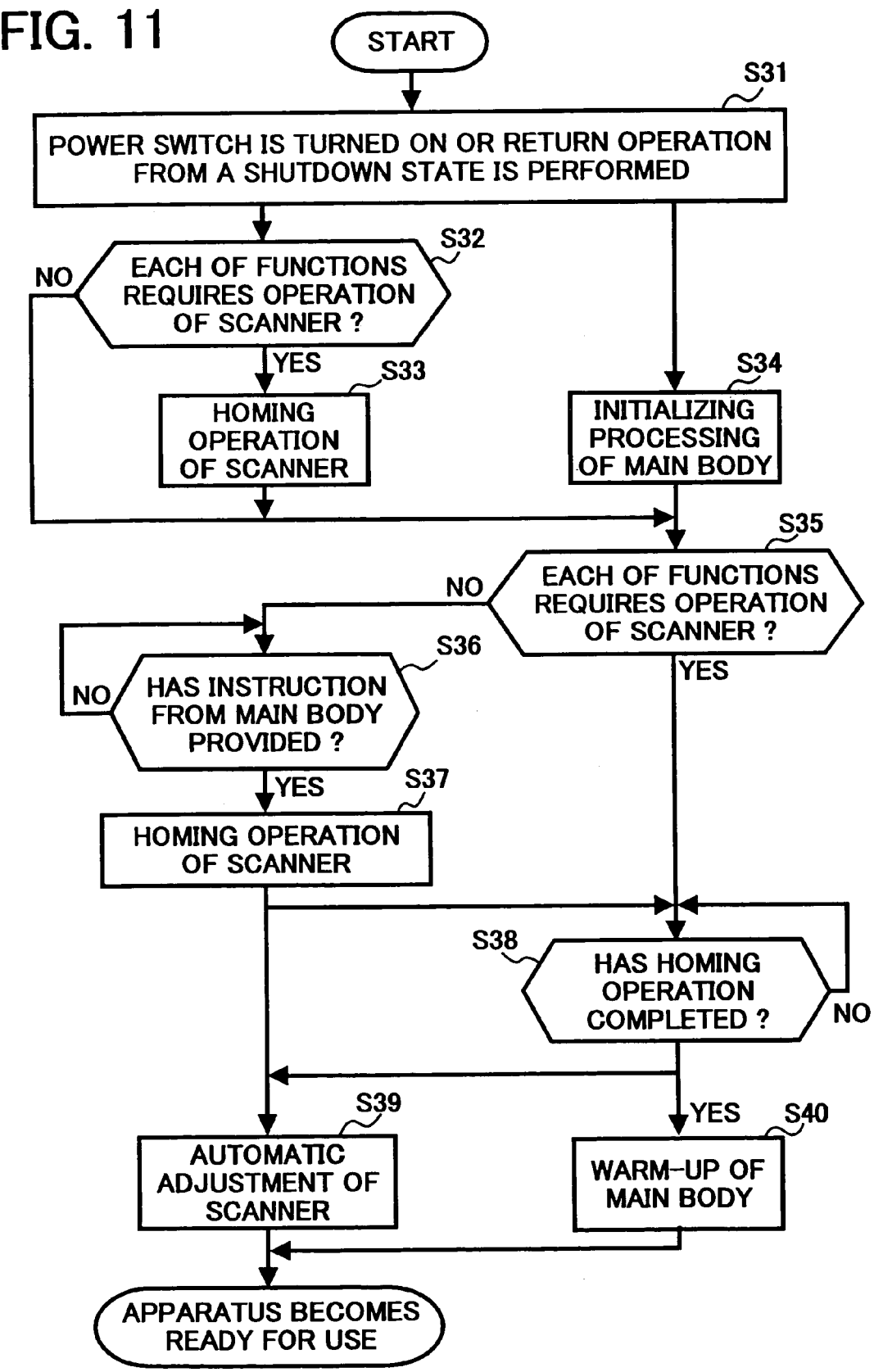
FIG. 11 is yet another flow chart showing the initializing process steps performed according to the present invention.

Further, FIG. 11 is a flow chart illustrating the initializing process steps according to the present invention. As shown in FIG. 11, the CPU 30 performs a power on reset of the scanner after a power-on operation or a return operation from a shutdown state is performed by the main body (step S31). After various internal initializing processes are performed, the data corresponding to the functions of the apparatus in the EEPROM 30e is checked (step S32). In this step, it is determined whether or not an operation of the scanner is required. When it is determined at least one of the functions does not require the operation of the scanner in step S32, the scanner enters into a state of waiting for an instruction from the main control board 116.

On the contrary, when it is determined each of the functions requires the operation of the scanner, the scanner immediately performs a homing operation (step S33) without waiting for an instruction from the main control board 116. The scanner then enters into a waiting-state for an instruction from the main control board 116.

Further, the main control board 116 performs the initializing process of the main body when a power switch is turned on or when a return operation from a shutdown state is performed (step S34). When the initializing process of the main body is completed, the preparation of data required for the scanner to make an automatic adjustment to its reading image data system is completed in the side of the main body. When each of the functions of the apparatus requires the operation of the scanner (step S35), the main control board 116 confirms whether or not a homing operation of the scanner has been normally performed (step S38) by communicating with the CPU 30 of the scanner.

In addition, when the homing operation is erroneously performed, an occurrence of the abnormal homing operation is indicated to stop the operation. When the completion of the homing operation is confirmed, the main control board 116 supplies the scanner with the data required for making an automatic adjustment to the reading image data system of the scanner. The scanner then makes the automatic adjustment based on the data supplied from the main control board 116 (step S39).

Further, in the side of the main body, a warm-up operation is performed (step S40) until the main body reaches a predetermined temperature required for a fixing process of an image, after the completion of the homing operation of the scanner has been confirmed.

When it is determined at least one of the functions does not require the operation of the scanner in the step S35, the main control board 116 determines whether or not the operation of the scanner is necessary to perform the instructed operation. When the main control board 116 determines the operation of the scanner is required, the main control board 116 provides the scanner with an instruction to perform a homing operation.

In addition, the scanner communicates with the CPU 30 to confirm the instruction (step S36), and then performs the homing operation (step S37). Further, the scanner performs the automatic adjustment (step S39) after the homing operation has been performed. The main control board 116 also performs the warm-up operation (step S40) when it confirms the homing operation of the scanner has been appropriately performed (step S38). When all necessary initializing processes including the automatic adjustment of the scanner and the warm-up of the main body have completed, the apparatus is ready for use.

Turning now to FIGS. 12A and 12B, which are timing diagrams for the initializing process performed when a power switch is turned on or when a return operation from a shutdown state is performed according to the present invention. In more detail, FIGS. 12A and 12B show examples of time periods for the initializing processes when each of the functions requires an operation of the scanner and when at least one of the functions does not require the operation of the scanner, respectively.

Conventionally, the CPU 30 of the scanner is in a waiting-state for an instruction from the main control board 116 after it has performed an initializing process, such as a power on reset operation, and so forth (see FIGS. 15A and 15B), when a power switch is turned on. As discussed above, it takes a long time before the initializing process is performed by the main control board 116 is completed and the main control board 116 is ready to provide an instruction to the CPU 30 of the scanner. During the time period when the main control board 116 performs the initializing process, the CPU 30 of the scanner stops its operation.

However, according to the present invention, it is determined whether or not each of the functions requires an operation of the scanner. When each of the functions requires the operation of the scanner, a homing operation of the scanner is performed during the period of time when the initializing process of the main body is performed (which conventionally is a waiting period for the scanner). Thus, with the arrangement of the present invention, the homing operation of the scanner is performed in parallel with the initializing process of the main body, which eliminates the extra time for the homing operation of the scanner, and the time required to get the apparatus up and running is reduced.

As illustrated in FIG. 12B, when at least one of the functions does not require the operation of the scanner, the homing operation of the scanner is performed based on an instruction provided from the main body after the initializing process of the main body is performed. That is, the scanner is in a waiting-state for an instruction from the main body without performing a homing operation, when an instruction is not provided from the main body (this operation differs from that illustrated in FIG. 12B).

For example, in a multifunctional image forming apparatus configured to perform a return operation from a shutdown state when it receives a facsimile message, a scanner does not need to be operated. However, when the apparatus is configured to perform a homing operation of the scanner whenever the return operation from a shutdown state is performed, an unnecessary initializing processing of the scanner is performed. According to the present invention, the above-described unnecessary initializing process of the scanner is not performed.

Another example of the initializing process of a scanner performed according to the present invention will now be described. In this example, the above-described mode selection device is provided so the scanner selects whether or not it independently performs a homing operation when a power switch is turned on or when a return operation from a shutdown state is performed. The selection of whether or not the homing operation is performed is based on the contents of a volatile RAM or a LATCH, instead of an EEPROM used in the previous example. Data on functions of a multifunctional image forming apparatus is written into the RAM or the LATCH, and an operational mode is selected based on the written data.

Further, power supplied to a monitoring section of the main body is also supplied to the RAM/LATCH. Therefore, power is supplied to the RAM/LATCH even when the apparatus is shutdown. Thus, although the contents of the RAM/LATCH are erased when the power is shut off, the content of the RAM/LATCH is retained when the apparatus is shutdown. Therefore, an initializing operation can be performed after a return operation from a shutdown state. In addition, when the power is turned on, the contents of the RAM/LATCH are indefinite. Consequently, it is indefinite whether a homing operation is performed at a power-on time or after an initializing process of the main body has been performed. The main control board 116 starts and detects the functions of the apparatus so as to provide the detected data to the scanner. The data is then written into the RAM/LATCH via the CPU 30 of the scanner. Because the data on the functions is written into the RAM/LATCH and retained in it, an operational mode can be selected based on the data when a return operation from a shutdown state is performed.

In addition, the data written into the RAM/LATCH is erased when the power is shut off, and the contents of the RAM/LATCH become indefinite when the power is turned on. To deal with this phenomenon, a homing operation is performed based on an instruction from the main body, when the power is turned on. That is, when the power is turned on, the homing operation executed by the direct control of the CPU 30 is not performed. On the contrary, the homing operation is performed based on an instruction from the main control board 116. Then, when a return operation from a shutdown state is performed, an operational mode is selected based on the data of the functions of the apparatus written in the RAM/LATCH so as to perform the selected operation.

More specifically, when a return operation from a shutdown state is performed, a homing operation is performed in the following manner. When at least one of the functions of the apparatus does not require an operation of the scanner according to the data stored in a volatile memory, the homing operation of the scanner is performed based on an instruction from the main control board 116. When each of the functions of the apparatus requires the operation of the scanner, the homing operation of the scanner is performed independently by an instruction from a direct control section of the scanner without waiting for the completion of initializing process of the main body.

Figure 13:
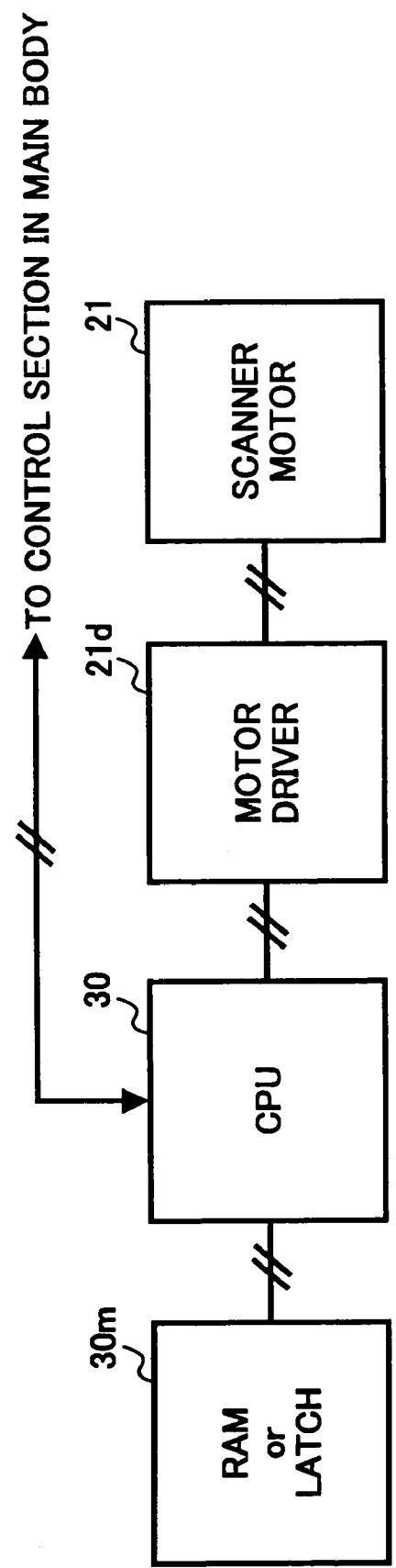
FIG. 13 is still another diagram illustrating a configuration of the control section of the scanner performing the initializing process according to the present invention.
Figure 14:
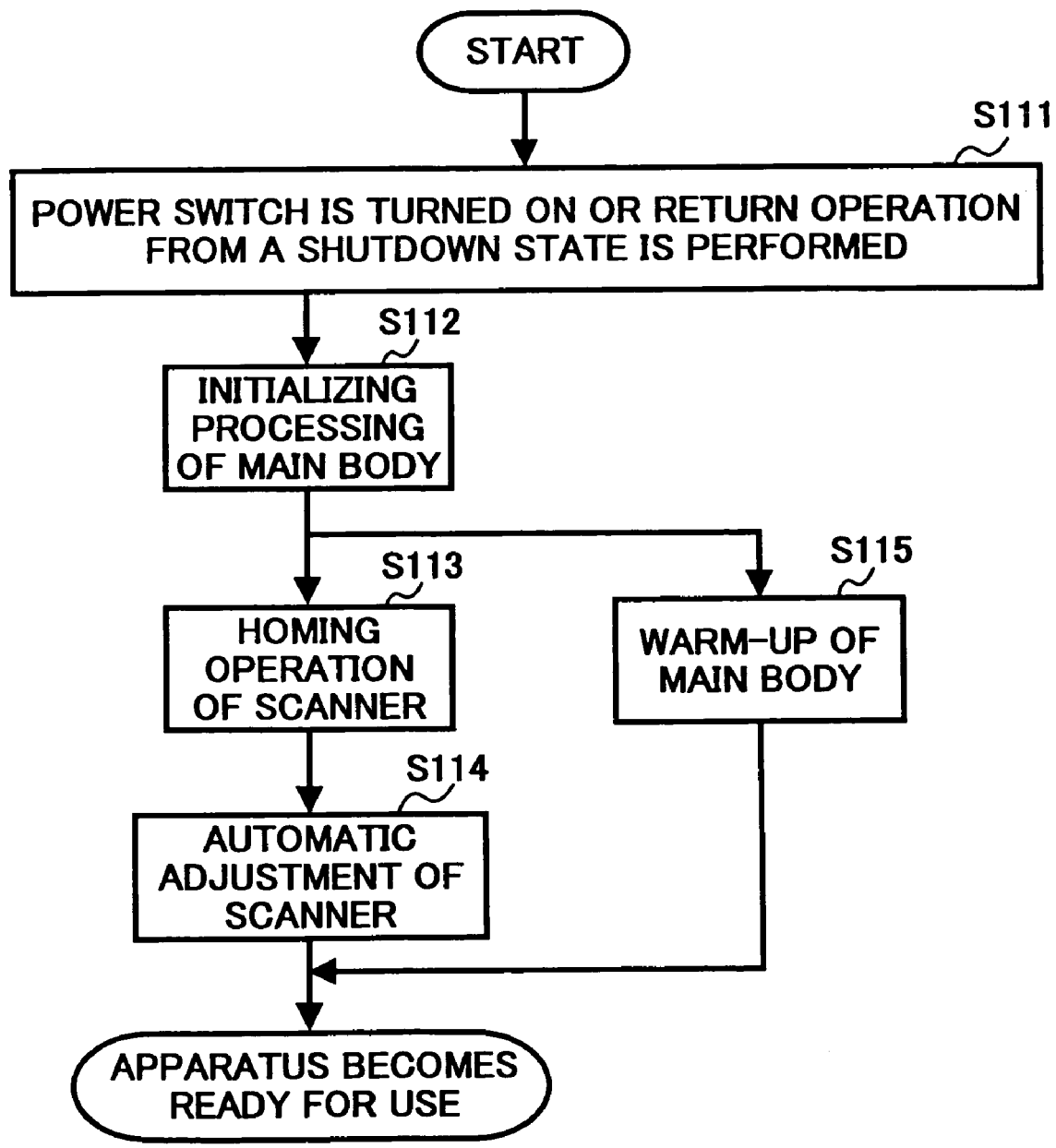
FIG. 14 is a flow chart showing the initializing process steps of the background art.

Turning now to FIG. 13, which is a diagram illustrating a configuration of a control section of the scanner performing the initializing process according to the present invention. As illustrated in FIG. 13, a direct control section of the scanner includes the CPU 30, the motor driver 21d, and the RAM/LATCH 30m. The RAM/LATCH 30m retains data on functions included with a multifunctional image forming apparatus, and serves as the above-mentioned mode selection device by providing the data to the CPU 30. The direct control section of the scanner also controls a positioning of a scanner carriage by driving the scanner motor 21 so that a homing operation is performed in the initializing process of the scanner. Namely, the CPU 30 decides whether or not it performs the homing operation of the scanner based on the contents of the RAM/LATCH 30m, when a return operation from a shutdown state is performed.

According to this example, when the main control board 116 normally starts, it detects functions included in the apparatus. The detected contents are provided to the scanner and written into the RAM/LATCH 30m via the CPU 30. Because the data is retained even when a return operation from a shutdown state is performed, the contents of the RAM/LATCH 30m include the data on the functions of the apparatus. Therefore, according to this example, the RAM/LATCH 30m is used in place of the EEPROM 30e.

Further, identical operations are performed in the two above-examples when the main control board 116 starts or when a return operation from a shutdown state is performed.

The identical initializing process described with reference to FIGS. 11 and 12 is also performed in this example. Further, an operation of the RAM/LATCH 30e is indefinite when the power is turned on. However, the operation of the RAM/LATCH 30e at a power-on time can be regulated by regulating whether at least one of the functions does not require an operation of the scanner or each of the functions requires the operation of the scanner based on a specific pattern of the contents of the RAM/LATCH 30m, which prevents the apparatus from becoming inoperative. With this arrangement, the identical operations described in the above-example can be performed in this example when the power is turned on or when a return operation from a shutdown state is performed.

In addition, an operation can be performed by preparing and using a program in which the procedures of the initializing process (which the CPU 30 of the scanner and the MPU 10 of the main control board 116 perform) is written. The program can be recorded in a commonly known computer-readable recording media. The recording media is used under the control of the CPU 30 of the scanner and the MPU 10 of the main control board 116, or the program can be installed into a memory device so as to perform an initializing operation by reading the program.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. An image processing apparatus, comprising:
   a scanner including a direct control section configured to control a scanning operation of the scanner so as to input image information from an original document; and
   a main body configured to process the image information, and including a control section configured to perform an initializing process for the main body,
   wherein a homing operation of the scanner is performed by the direct control section independently of the initializing process of the control section of the main body, when power is supplied to the image processing apparatus or when the image processing apparatus is returned from a shutdown state, wherein a warm-up of said main body is started when the control section of the main body confirms a completion of the homing operation of the scanner, and wherein when the control section of the main body confirms the completion of the homing operation of the scanner, the control section of the main body supplies necessary data for making an automatic adjustment to the scanner, and the scanner makes the automatic adjustment based on the data supplied from the control section of the main body.

2. The image forming apparatus according to claim 1, wherein an occurrence of an abnormal homing operation stops the homing operation when the homing operation is erroneously performed.

3. An image processing apparatus, comprising:

a scanner including a direct control section configured to control a scanning operation of the scanner so as to input image information from an original document;

an image input device other than said scanner configured to input image information;

a main body configured to process the image information input by the scanner and the image input device, said main body including a control section configured to perform an initializing process for said main body; and an operation device configured to determine whether a homing operation of said scanner is performed by the direct control section independently of the initializing process of the control section of the main body or by an instruction provided from the control section of the main body, when power is supplied to the image processing apparatus or when the image processing apparatus is returned from a shutdown state, wherein a warm-up of said main body is started when the control section of the main body confirms a completion of the homing operation of the scanner, and wherein when the control section of the main body confirms the completion of the homing operation of the scanner, the control section of the main body supplies necessary data for making an automatic adjustment to the scanner, and the scanner makes the automatic adjustment based on the data supplied from the control section of the main body.

4. The image forming apparatus according to claim 3, wherein an occurrence of an abnormal homing operation stops the homing operation when the homing operation is erroneously performed.

5. An image processing apparatus having a plurality of functions, comprising:

a scanner including a direct control section configured to control a scanning operation of the scanner so as to input image information from an original document;

an image input device other than said scanner configured to input image information;

a main body configured to process the image information input by said scanner and said image input device, said main body including a control section configured to perform an initializing process for said main body; and an operational mode selection device configured to select one of a first operational mode in which a homing operation of the scanner is performed by the direct control section independently of the initializing process of the control section of the main body, and a second operational mode in which the homing operation of the scanner is performed by an instruction provided from the control section of the main body, when power is supplied to the image processing apparatus or when the image processing apparatus is returned from a shutdown state, wherein said operational mode selection device selects the first operational mode when each of the plurality of functions is fulfilled with said scanner, and selects the second operational mode when at least one of the plurality of functions is fulfilled without the scanner, wherein a warm-up of said main body is started when the control section of the main body confirms a completion of the homing operation of the scanner, and wherein when the control section of the main body confirms the completion of the homing operation of the scanner, the control section of the main body supplies necessary data for making an automatic adjustment to the scanner and the scanner makes the automatic adjustment based on the data supplied from the control section of the main body.

6. The image forming apparatus according to claim 5, wherein an occurrence of an abnormal homing operation stops the homing operation when the homing operation is erroneously performed.

7. The image processing apparatus according to claim 5, wherein the operational mode selection device includes a volatile memory configured to store data, detected by the control section of the main body, on the plurality of functions of the image processing apparatus, and wherein the operational mode selection device selects the first or second operational modes based on the data stored in the volatile memory.

8. The image processing apparatus according to claim 5, wherein the plurality of functions comprise at least one of a facsimile function, a printer function, and a filing function in addition to a copying function.

9. A method for initializing an image processing apparatus having a main body for processing image information input by a scanner, comprising:

performing a homing operation of the scanner independently of an initializing process of the main body, when power is supplied to the image processing apparatus or when the image processing apparatus is returned from a shutdown state, supplying necessary data for making an automatic adjustment to the scanner, the necessary data being supplied by a control section of the main body to the scanner, and automatically adjusting the scanner based on the necessary data, when the control section of the main body confirms a completion of the homing operation of the scanner, and starting a warm-up of said main body, when the control section of the main body confirms the completion of the homing operation of the scanner.

10. A method for initializing an image processing apparatus having a main body for processing image information input by a scanner, comprising:

selecting a first operational mode in which a homing operation of the scanner is performed by a direct control section of the scanner independently of an initializing process of the main body or a second operational mode in which the homing operation of the scanner is performed by an instruction provided from the main body, supplying necessary data for making an automatic adjustment to the scanner, the necessary data being supplied by a control section of the main body to the scanner, and automatically adjusting the scanner based on the necessary data, when the control section of the main body confirms a completion of the homing operation of the scanner, and starting a warm-up of said main body, when the control section of the main body confirms the completion of the homing operation of the scanner.

11. A method for initializing an image processing apparatus having a plurality of functions and a main body for processing image information input by a scanner or another image input device, comprising:

detecting a plurality of functions included in the image processing apparatus; and selecting a first operational mode in which a homing operation of the scanner is performed by a direct control section of the scanner independently of an initializing process of the main body when each of the plurality of functions is fulfilled with the scanner or selecting a second operational mode in which the homing operation of the scanner is performed by an instruction provided from the main body when at least one of the plurality of functions is fulfilled without said scanner, supplying a necessary data for making an automatic adjustment to the scanner, the necessary data being supplied by a control section of the main body to the scanner, and automatically adjusting the scanner based on the necessary data, when the control section of the main body confirms a completion of the homing operation of the scanner, and starting a warm-up of said main body, when the control section of the main body confirms the completion of the homing operation of the scanner.

12. The method according to claim 11, further comprising:

storing, in a volatile memory, data corresponding to the plurality of functions detected in the detecting step; and selecting the operational mode based on the data stored in the volatile memory.

13. The method according to claim 11, wherein the plurality of functions include at least one of a facsimile function, a printer function, and a filing function in addition to a copying function.

14. A method for initializing an image processing apparatus having a plurality of functions and a main body for processing image information input by a scanner or another image input device, comprising:

detecting a plurality of functions included in the image processing apparatus;

storing, in a volatile memory, data corresponding to the plurality of functions detected in the detecting step; and selecting a first operational mode in which a homing operation of the scanner is performed by a direct control section of the scanner independently of an initializing process of the main body when each of the plurality of functions stored in the volatile memory is fulfilled with said scanner when the image processing apparatus is returned from a shutdown state, or selecting a second operational mode in which the homing operation of the scanner is performed by an instruction provided from the main body when power is supplied to the image processing apparatus and when at least one of the plurality of functions stored in the volatile memory is fulfilled without said scanner when the image processing apparatus is returned from the shutdown state, supplying a necessary data for making an automatic adjustment to the scanner, the necessary data being supplied by a control section of the main body to the scanner, and automatically adjusting the scanner based on the necessary data, when the control section of the main body confirms a completion of the homing operation of the scanner, and starting a warm-up of said main body, when the control section of the main body confirms the completion of the homing operation of the scanner.

15. The method according to claim 14, wherein the plurality of functions include at least one of a facsimile function, a printer function, and a filing function in addition to a copying function.

16. An image processing apparatus, comprising:

scanner means including a direct control section for controlling a scanning operation of the scanner means so as to input image information from an original document; and main body means for processing the image information, and including a control section for performing an initializing process of the main body means, wherein a homing operation of the scanner means is performed by the direct control section independently of the initializing process of the control section of the main body means, when power is supplied to the image processing apparatus or when the image processing apparatus is returned from a shutdown state, wherein a warm-up of said main body means is started when the control section of the main body means confirms a completion of the homing operation of the scanner means, and wherein when the control section of the main body means confirms the completion of the homing operation of the scanner means, the control section of the main body means supplies the necessary data for making an automatic adjustment to the scanner means, and the scanner means makes the automatic adjustment based on the data supplied from the control section of the main body means.

17. An image processing apparatus, comprising:

scanner means including a direct control section for controlling a scanning operation of the scanner means so as to input image information from an original document;

image input means other than said scanner means for inputting image information;

main body means for processing the image information input by the scanner means and the image input means, said main body means including a control section for performing an initializing process of said main body means; and operational means for determining whether a homing operation of said scanner means is performed by the direct control section independently of the initializing process of the control section of the main body means or by an instruction provided from the control section of the main body means when power is supplied to the image processing apparatus or when the image processing apparatus is returned from a shutdown state, wherein a warm-up of said main body means is started when the control section of the main body means confirms a completion of the homing operation of the scanner means, and wherein when the control section of the main body means confirms the completion of the homing operation of the scanner means, the control section of the main body means supplies the necessary data for making an automatic adjustment to the scanner means, and the scanner means makes the automatic adjustment based on the data supplied from the control section of the main body means.

18. An image processing apparatus having a plurality of functions, comprising:
scanner means including a direct control section for controlling a scanning operation of the scanner means so as to input image information from an original document;
image input means other than said scanner means for inputting image information;
main body means for processing the image information input by said scanner means and said image input means, said main body means including a control section for performing an initializing process of said main body means; and
operational mode selection means for selecting one of a first operational mode in which a homing operation of the scanner means is performed by the direct control section independently of the initializing process of the control section of the main body means, and a second operational mode in which the homing operation of the scanner means is performed by an instruction provided from the control section of the main body means, when power is supplied to the image processing apparatus or when the image processing apparatus is returned from a shutdown state,
wherein said operational mode selection means selects the first operational mode when each of the plurality of functions is fulfilled with said scanner means, and selects the second operational mode when at least one of the plurality of functions is fulfilled without the scanner means, and
wherein a warm-up of said main body means is started when the control section of the main body means confirms a completion of the homing operation of the scanner means, and
wherein when the control section of the main body means confirms the completion of the homing operation of the scanner means, the control section of the main body means supplies the necessary data for making an automatic adjustment to the scanner means, and the scanner means makes the automatic adjustment based on the data supplied from the control section of the main body means.

19. The image processing apparatus according to claim 18, wherein the plurality of functions comprise at least one of a facsimile function, a printer function, and a filing function in addition to a copying function.

20. The image processing apparatus according to claim 18, wherein the operational mode selection means includes memory means for storing data, detected by the control section of the main body means on the plurality of functions of the image processing apparatus, and
wherein the operational mode selection means selects the first or second operational modes based on the data stored in the memory means.

21. An image processing apparatus having a plurality of functions, comprising:
scanner means including a direct control section for controlling a scanning operation of the scanner means so as to input image information from an original document;
image input means other than said scanner means for inputting image information;
main body means for processing the image information input by said scanner means and said image input means, said main body means including a control section for performing an initialization process of said main body means; and
operational mode selection means for selecting one of a first operational mode in which a homing operation of the scanner means is performed by the direct control section independently of the initializing process of the control section of the main body means, and a second operational mode in which the homing operation of the scanner means is performed by an instruction provided from the control section of the main body means, said operational mode selection device including memory means for storing data, detected by the control section of the main body means, on the plurality of functions of the image processing apparatus,
wherein the operational mode selection means selects the first operational mode when each of the plurality of functions is fulfilled with said scanner means when the image processing apparatus is returned from a shutdown state, and selects the second operational mode when power is supplied to the image processing apparatus, and
wherein the operational mode selection means selects the second operational mode when the data stored in the memory means includes at least one of the plurality of functions fulfilled without the scanner means when the image processing apparatus is returned from a shutdown state,
wherein a warm-up of said main body means is started when the control section of the main body means confirms a completion of the homing operation of the scanner means, and
wherein when the control section of the main body means confirms the completion of the homing operation of the scanner means, the control section of the main body means supplies the necessary data for making an automatic adjustment to the scanner means, and the scanner means makes the automatic adjustment based on the data supplied from the control section of the main body means.

22. The image processing apparatus according to claim 21, wherein the plurality of functions comprise at least one of a facsimile function, a printer function, and a filing function in addition to a copying function.

23. A computer readable medium including computer program instructions that cause a computer to implement a method of initializing an image processing apparatus having a main body for processing image information input by a scanner, comprising:
a first computer code for performing a homing operation of the scanner independently of an initializing process of the main body, when power is supplied to the image processing apparatus or when the image processing apparatus is returned from a shutdown state,
a second computer code for supplying necessary data for making an automatic adjustment to the scanner, the necessary data being supplied by a control section of the main body to the scanner, and automatically adjusting the scanner based on the necessary data, when the control section of the main body confirms a completion of the homing operation of the scanner, and
a third computer code for starting a warm-up of said main body, when the control section of the main body confirms the completion of the homing operation of the scanner.

24. A computer readable medium including computer program instructions that cause a computer to implement a method of initializing an image processing apparatus having a main body for processing image information input by a scanner, comprising:

a first computer code for selecting a first operational mode in which a homing operation of the scanner is performed by a direct control section of the scanner independently of an initializing process of the main body or a second operational mode in which the homing operation of the scanner is performed by an instruction provided from the main body, a second computer code for supplying necessary data for making an automatic adjustment to the scanner, the necessary data being supplied by a control section of the main body to the scanner, and automatically adjusting the scanner based on the necessary data, when the control section of the main body confirms a completion of the homing operation of the scanner, and a third computer code for starting a warm-up of said main body, when the control section of the main body confirms the completion of the homing operation of the scanner.

25. A computer readable medium including computer program instructions that cause a computer to implement a method of initializing an image processing apparatus having a plurality of functions and a main body for processing image information input by a scanner or another image input device, comprising:

a first computer code for detecting a plurality of functions included in the image processing apparatus; and a second computer code for selecting a first operational mode in which a homing operation of the scanner is performed by a direct control section of the scanner independently of an initializing process of the main body when each of the plurality of functions is fulfilled with the scanner or selecting a second operational mode in which the homing operation of the scanner is performed by an instruction provided from the main body when at least one of the plurality of functions is fulfilled without said scanner;

a third computer code for supplying necessary data for making an automatic adjustment to the scanner, the necessary data being supplied by a control section of the main body to the scanner, and automatically adjusting the scanner based on the necessary data, when the control section of the main body confirms a completion of the homing operation of the scanner; and a fourth computer code for starting a warm-up of said main body, when the control section of the main body confirms the completion of the homing operation of the scanner.

26. The computer readable medium according to claim 25, wherein the plurality of functions include at least one of a facsimile function, a printer function, and a filing function in addition to a copying function.

27. The computer readable medium according to claim 25, further comprising:

a fifth computer code for storing, in a volatile memory, data corresponding to the plurality of functions detected by the first computer code; and a sixth computer code for selecting the operational mode based on the data stored in the volatile memory.

28. A computer readable medium including computer program instructions that cause a computer to implement a method of initializing an image processing apparatus having a plurality of functions and a main body for processing image information input by a scanner or another image input device, comprising:

a first computer code for detecting a plurality of functions included in the image processing apparatus;

a second computer code for storing, in a volatile memory, data corresponding to the plurality of functions detected by the first computer code;

a third computer code for selecting a first operational mode in which a homing operation of the scanner is performed by a direct control section of the scanner independently of an initializing process of the main body when each of the plurality of functions stored in the volatile memory is fulfilled with said scanner when the image processing apparatus is returned from a shutdown state, or selecting a second operational mode in which the homing operation of the scanner is performed by an instruction provided from the main body when power is supplied to the image processing apparatus and when at least one of the plurality of functions stored in the volatile memory is fulfilled without said scanner when the image processing apparatus is returned from the shutdown state;

a fourth computer code for supplying necessary data for making an automatic adjustment to the scanner, the necessary data being supplied by a control section of the main body to the scanner, and automatically adjusting the scanner based on the necessary data, when the control section of the main body confirms a completion of the homing operation of the scanner; and a fifth computer code for starting a warm-up of said main body, when the control section of the main body confirms the completion of the homing operation of the scanner.

29. The computer readable medium according to claim 28, wherein the plurality of functions include at least one of a facsimile function, a printer function, and a filing function in addition to a copying function.

* * * * *